(12) United States Patent
Kim et al.

(10) Patent No.: US 6,753,742 B2
(45) Date of Patent: Jun. 22, 2004

(54) SIGNAL COUPLING APPARATUS FOR COMMUNICATION BY MEDIUM VOLTAGE POWER LINE

(75) Inventors: Yo-Hee Kim, Sungnum-si (KR); Kwan-Ho Kim, Seoul (KR); Won-Tae Lee, Sungnum-si (KR); Jae-Jo Lee, Anyang-si (KR)

(73) Assignee: Korea Electro Technology Research Institute, Changwon-si (KR)

( * ) Notice: Subject to any disclaimer, the term of this patent is extended or adjusted under 35 U.S.C. 154(b) by 0 days.

(21) Appl. No.: 10/216,898

(22) Filed: Aug. 13, 2002

(65) Prior Publication Data

US 2004/0032307 A1 Feb. 19, 2004

(51) Int. Cl.[7] .............................................. H04M 11/08
(52) U.S. Cl. ................. 333/24 R; 340/310.01
(58) Field of Search ............... 333/24 R, 165, 333/1; 340/870.01, 310.01, 310.05, 310.07, 310.06; 361/601; 379/93.36; 455/270; 725/79; 702/122

(56) References Cited

U.S. PATENT DOCUMENTS 6,255,935 B1 * 7/2001 Lehmann et al. ...... 340/310.07

FOREIGN PATENT DOCUMENTS

| WO | WO 95/15036 | * | 6/1995 |
| WO | WO 03/44967 | * | 5/2003 |

* cited by examiner

*Primary Examiner*—Patrick Wamsley
(74) *Attorney, Agent, or Firm*—Robert E. Bushnell, Esq.

(57) ABSTRACT

A signal coupling apparatus for communication by a medium voltage power line comprises a housing with an inner cavity; an electrode formed on one edge of the housing, one end of the electrode connected to an external medium voltage lead line; a coupling capacitor formed within the cavity and connected to the other end of the electrode; a drain coil formed within the cavity and connected to the coupling capacitor; a power-sided ground terminal formed on one edge of the housing, one end of the ground terminal connected to the drain coil and the other end of the ground terminal connected to a ground terminal of a power system; and a communication-sided connection terminal formed on one edge of the housing, one end of the connection terminal connected to the coupling capacitor and the other end of the connection terminal connected to an external communication equipment.

37 Claims, 4 Drawing Sheets

SIGNAL COUPLING APPARATUS FOR COMMUNICATION BY MEDIUM VOLTAGE POWER LINE

BACKGROUND OF THE INVENTION

1. Field of the Invention

The present invention relates to a signal coupling apparatus using a medium voltage power line as a communication line, and more particularly to a signal coupling apparatus which achieves a wide-band high speed communication and is easily installed on and connected between a medium voltage power line and a communications device.

2. Description of the Related Art

Generally, a low-frequency narrow-band signal coupling apparatus using a film capacitor is used as a signal coupling apparatus for communication over a power line. A frequency band usually assigned in a power line communication is less than 450 kHz. Frequency transfer characteristic of the film capacitor satisfies this trend. The conventional power line carrier system has a low speed communication mode with a frequency band of less than 450 kHz. This system usually uses an ultra high-voltage transmission line of more than 66 kV as a transmission line. A coupling capacitor used for the conventional power line carrier system is manufactured as a ground-deferred type with a big size and designed to have a high withstand voltage characteristic, thereby lowering the frequency band. Therefore, this coupling capacitor is not proper in wide band (high speed) communication.

SUMMARY OF THE INVENTION

The present invention has been made in view of the above problems, and it is an object of the present invention to provide a signal coupling apparatus for communication over a medium voltage power line, which achieves wide-band high-speed communication, is easily installed on and connected to a medium voltage power distribution line, and is miniaturized.

In accordance with the present invention, the above and other objects can be accomplished by the provision of a signal coupling apparatus for communication by a medium voltage power line, comprising: a housing with an inner cavity; an electrode formed on one end of the housing, one end of the electrode being connected to an external medium voltage lead line; a coupling capacitor disposed within the housing and connected to the other end of the electrode; a drain coil disposed within the housing and connected in series between the coupling capacitor and a power-sided ground terminal connected at a second end of the housing, the coupling capacitor and drain coil forming a high frequency band pass filter; and a communication-sided connection terminal formed on the second end of the housing, one end of the connection terminal being connected to the coupling capacitor and the other end of the connection terminal connected to external communication equipment.

The signal coupling apparatus for communication over the medium voltage power line of the present invention comprises a high withstand voltage capacitor, thereby achieving wide-band high-speed communication of tens of MHz.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
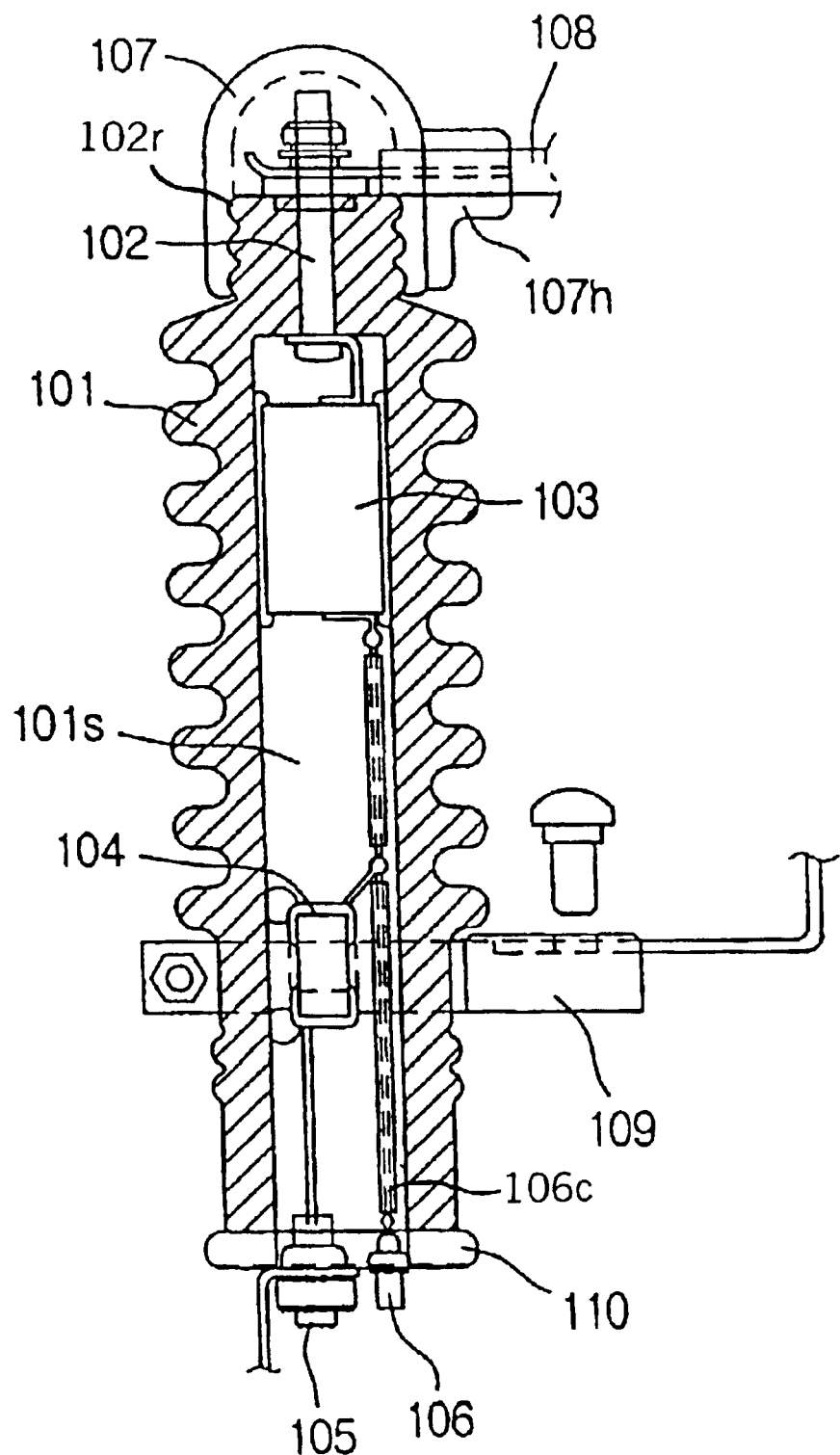
FIG. 1 is a schematic cross-sectional view of a signal coupling apparatus for communication over a medium voltage power line in accordance with the present invention.
Figure 2:
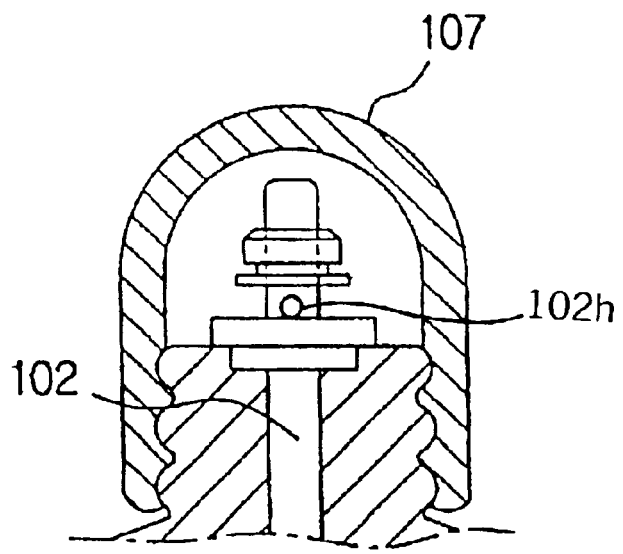
FIG. 2 is a cross-sectional view of a protection cap of the signal coupling apparatus of FIG. 1 taken along line A—A of FIG. 4.
Figure 3:
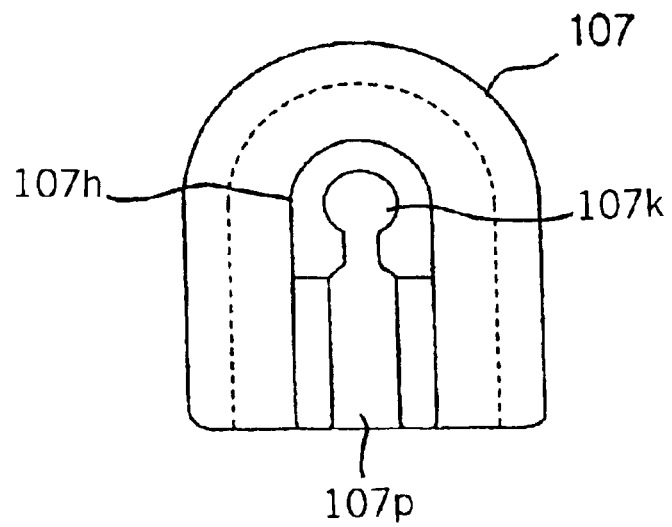
FIG. 3 is a front view of the protection cap of the signal coupling apparatus of FIG. 1.

With reference to FIGS. 1 to 3, the signal coupling apparatus for communication over the medium voltage power line comprises a housing 101, a medium voltage connectable electrode 102, a coupling capacitor 103, a drain coil 104, a power-sided ground terminal 105, a communication-sided connection terminal 106, and a protection cap 107.

A tunnel-shaped cavity 101s is formed on the inside of the housing 101. In order to prevent surface flashover from a charging area, to which the medium voltage connectable electrode 102 and a medium voltage lead line 108 are connected, to a housing fixable attachment unit 109 formed on or connected to a lower portion of the housing 101, most of the outer surface of the housing 101 is cylindrical and formed in a corrugated shape. The end section of housing 101, over which protection cap 107 is fitted, is also cylindrical and includes a plurality circumferential ridges 102r having a smaller diameter than the corrugated portion of housing 101. The housing fixable attachment unit 109 is mounted to an external support (not shown) such as a pole which carries said medium voltage lead 108.

Preferably, the housing 101 is made of a high insulating material such as ceramic or silicon rubber. Further, preferably, in order to improve insulating strength, the cavity 101s is vacuum-processed or filled with high insulating gas, for example $SF_6$ (sulfur hexafluoride).

As shown in FIG. 1, the medium voltage connectable electrode 102 is formed through the housing 101. One end of the medium voltage connectable electrode 102 is connected to the medium voltage lead line 108 by inserting the conductive portion of the voltage lead line 108 through a lead line insertion hole 102h, as shown in FIG. 2. The other end of the medium voltage connectable electrode 102 is connected to the coupling capacitor 103.

The coupling capacitor 103 is formed within the housing 101. The coupling capacitor 103 and the drain coil 104 form a high frequency band pass filter. This coupling capacitor 103 is a special manufactured capacitor with high withstand voltage and improved frequency characteristic, so as to achieve wide-band communication of about tens of MHz. The drain coil 104 is formed within the housing 101. One end of the drain coil 104 is connected to the coupling capacitor 103 and the other end of the drain coil 104 is connected to the power-sided ground terminal 105.

The communication-sided connection terminal 106 is formed on one edge of the housing 101. One end of the communication-sided connection terminal 106 is connected to the coupling capacitor 103 via a connection line 106c, and the other end of the communication-sided connection terminal 106 is connected to an external communication equipment 203 (see FIG. 5).

The detachable protection cap 107 is provided over the one end of the housing 101 connected to the medium voltage connectable electrode 102 and the medium voltage lead line 108. The protection cap 107 serves to protect this connection area and to prevent human body contact and flashover into the adjacent conductor. A lead line holder 107h for easily attaching/detaching the protection cap 107 and for more firmly fixing the medium voltage lead line 108 is integrated with the protection cap 107. Preferably, the protection cap 107 is made of climatic and high insulating elastic material, for example, synthetic rubber. A reference number 110 of FIG. 1 represents a metal lid for sealing the housing 101 on the end opposite the end on which protection cap 107 is fitted.

Figure 4:
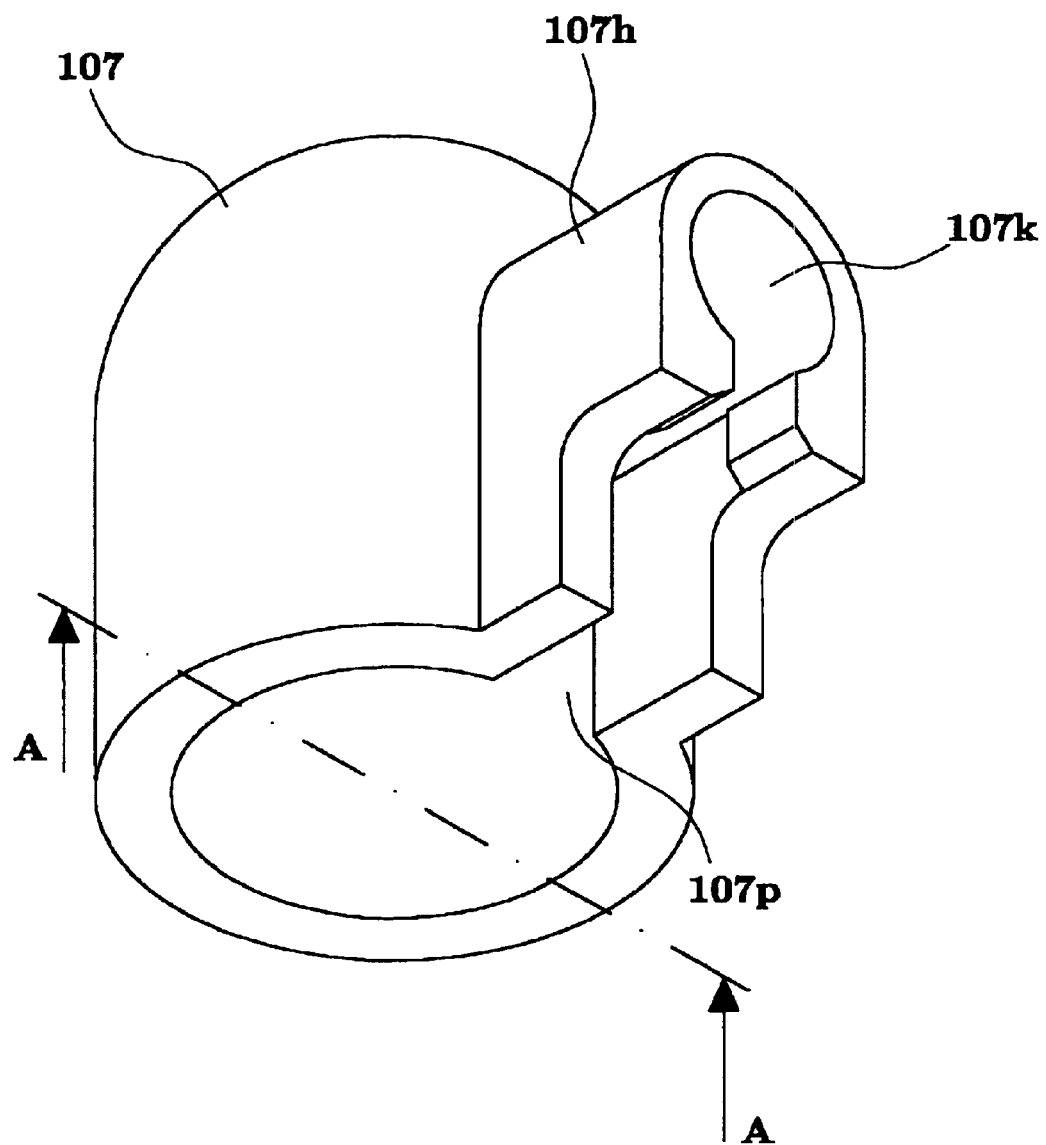
FIG. 4 is a perspective view of the protection cap of the signal coupling apparatus of FIG. 1.

Lead line holder 107h has the general shape shown in FIGS. 3 and 4, wherein a channel 107p and keyhole shaped opening 107k are provided to accommodate the fitting of protection cap 107 over voltage lead line 108. The circular portion of the keyhole shaped opening 107k has a diameter slightly less than a diameter of the insulated portion of the medium voltage lead line 108.

The signal coupling apparatus for communication by the medium voltage power line of the present invention comprises small-sized components and can be accommodated in an insulator-formed small capsule, thereby being safely installed on an electric pole of a distribution line or in a narrow space within a ground transformer for an underground line.

Figure 5:
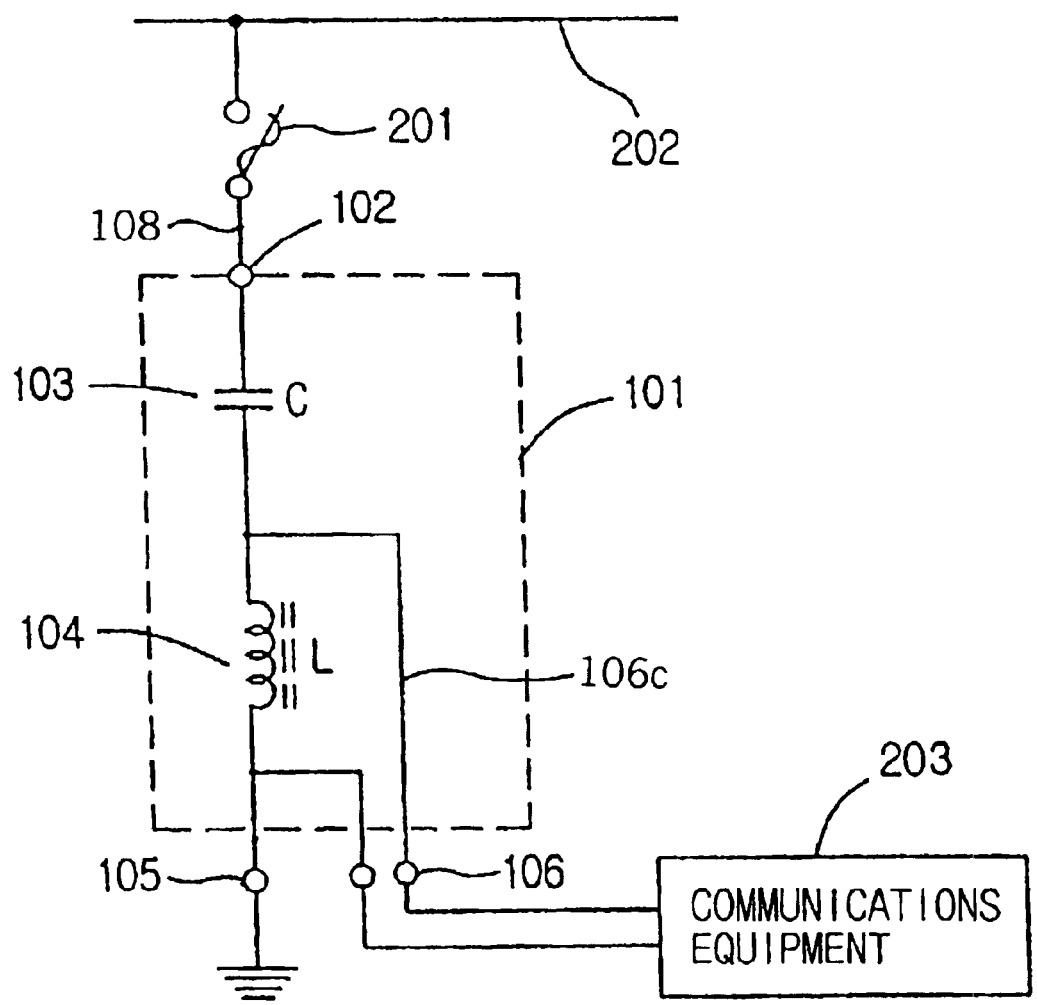
FIG. 5 is a circuit diagram of the signal coupling apparatus for communication over a medium voltage power line in accordance with the present invention.

FIG. 5 is a circuit diagram of the signal coupling apparatus for communication by medium voltage power line in accordance with the present invention.

As shown in FIG. 5, the signal coupling apparatus for communication by the medium voltage power line of the present invention serves to couple the medium voltage power line 202 with the communication equipment 203. That is, the power system-sided medium voltage power line 202 is connected to the communication system-sided communication equipment 203 via a cutout switch 201 provided with a power fuse and the coupling capacitor 103 of the present invention, thereby forming a communication link. Herein, the coupling capacitor provides a low impedance path for a carrier signal to the medium voltage power line, and the drain coil 104 provides a high impedance path to ground for the carrier signal with a very low impedance path for the power-frequency current and serves not to generate a power-frequency medium voltage, which is dangerous to the communication system.

That is, as described above, the coupling capacitor 103 and the drain coil 104 form a high-frequency band pass filter, thereby attenuating and transmitting high-frequency communication signals, and blocking low-frequency communication signals. Herein, the high-frequency band is from 100 kHz to 34 MHz.

Accordingly, the signal coupling apparatus for communication by the medium voltage power line of the present invention comprises a high withstand voltage capacitor, thereby achieving wide-band high-speed communication. Further, the signal coupling apparatus for communication by the medium voltage power line of the present invention can be accommodated in an insulator-formed small capsule by minimizing the components, thereby being safely installed on an electric pole of distribution line or in a narrow space within a ground transformer for underground line. Therefore, the signal coupling apparatus for communication by the medium voltage power line of the present invention can maximize its efficiency in function, safety, and economic conditions so as to be applicable to the medium voltage line communication condition.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A signal coupling apparatus for communication over a medium voltage power line, said signal coupling apparatus comprising:

a cylindrical housing having first and second ends and an inner cavity disposed between said first and second ends;

an electrode, a first end of said electrode protruding from said first end of said housing to be connected to an external medium voltage lead line, and a second end of said electrode extending into said inner cavity;

a coupling capacitor disposed within said inner cavity, a first terminal of said coupling capacitor being connected to said second end of said electrode;

a drain coil disposed within said inner cavity and having a first terminal connected to a second terminal of said coupling capacitor;

a power-sided ground terminal connected to said second end of said housing, a first terminal of said ground terminal being connected to a second terminal of said drain coil and a second terminal of said ground terminal to be connected to a power system ground terminal; and a communication-sided connection terminal connected to said second end of said housing, a first terminal of said communication-sided connection terminal being commonly connected to the second terminal of said coupling capacitor and the first terminal of said drain coil, and a second terminal of said communication-sided connection terminal to be connected to external communication equipment.

2. The signal coupling apparatus as set forth in claim 1, further comprising a protection cap which is mounted over said first end of said electrode and said first end of said housing after said medium voltage lead line is connected to said first end of said electrode.

3. The signal coupling apparatus as set forth in claim 2, further comprising a lead line holder integrated with the protection cap for accommodating said medium voltage lead line in order to easily attach and detach the protection cap and to more firmly fix the medium voltage lead line.

4. The signal coupling apparatus as set forth in claim 3, wherein the lead line holder integrated with the protection cap includes:

a channel through which said medium voltage lead line passes when said protection cap is attached or detached from said first end of said housing; and a keyhole shaped opening having a circular portion with a diameter slightly less than a diameter of an insulated portion of the medium voltage lead line for firmly clamping said lead line holder onto said insulated portion of the medium voltage lead line when said protection cap is attached to said first end of said housing.

5. The signal coupling apparatus as set forth in claim 4, wherein the protection cap is made of climatic and high insulating elastic material.

6. The signal coupling apparatus as set forth in claim 2, said first end of said housing having a diameter smaller than a diameter of said second end of said housing, said first end of said housing having a plurality of circumferential parallel ridges over which said protection cap is elastically mounted.

7. The signal coupling apparatus as set forth in claim 6, further comprising a lead line holder integrated with the protection cap for accommodating said medium voltage lead line in order to easily attach and detach the protection cap and to more firmly fix the medium voltage lead line.

8. The signal coupling apparatus as set forth in claim 6, wherein the protection cap is made of climatic and high insulating elastic material.

9. The signal coupling apparatus as set forth in claim 2, further comprising a housing fixable attachment unit fixed to a lower portion of said housing for mounting said housing to an external support.

10. The signal coupling apparatus as set forth in claim 9, said cylindrical housing having a corrugated outer surface to prevent surface flashover between a charging area, formed where the electrode is connected to the medium voltage lead line, and said housing fixable attachment unit.

11. The signal coupling apparatus as set forth in claim 2, wherein the protection cap is made of climatic and high insulating elastic material.

12. The signal coupling apparatus as set forth in claim 1, wherein the cavity is filled with a high insulating gas.

13. The signal coupling apparatus as set forth in claim 12, wherein the high insulating gas is sulfur hexafluoride ($SF_6$).

14. The signal coupling apparatus as set forth in claim 1, further comprising a cut-out switch disposed between said medium voltage lead line and said medium voltage power line.

15. The signal coupling apparatus as set forth in claim 14, said cut-out switch comprising a power fuse.

16. The signal coupling apparatus as set forth in claim 1, wherein said first end of said electrode includes an insertion hole through which a conductive portion of said medium voltage lead line is inserted when connecting said medium voltage lead line to said first end of said electrode.

17. The signal coupling apparatus as set forth in claim 1, wherein the coupling capacitor and drain coil form a high pass filter, and a high frequency band of said high pass filter is from 100 kHz to 34 MHz.

18. The signal coupling apparatus as set forth in claim 1, wherein the cavity is vacuum processed.

19. A signal coupling apparatus for communication over a power line, said signal coupling apparatus comprising:
a cylindrical housing having first and second ends and an inner cavity disposed between said first and second ends;
an electrode, a first end of said electrode protruding from said first end of said housing to be connected to an external voltage lead line connected to said power line, and a second end of said electrode extending into said inner cavity; and
a high-pass filter disposed within said cavity, a first terminal of said high-pass filter being connected to said second end of said electrode, a second terminal of said high-pass filter being connected to a power-sided ground terminal fixed to said second end of said housing, and a third terminal of said high-pass filter being connected to a communication-sided connection terminal fixed to said second end of said housing.

20. The signal coupling apparatus as set forth in claim 19, further comprising a protection cap which is mounted over said first end of said electrode and said first end of said housing after said voltage lead line is connected to said first end of said electrode.

21. The signal coupling apparatus as set forth in claim 20, wherein said first end of said electrode includes an insertion hole through which a conductive portion of said voltage lead line is inserted when connecting said voltage lead line to said first end of said electrode, a charging area being formed where said voltage lead line is connected to said first end of said electrode.

22. The signal coupling apparatus as set forth in claim 21, further comprising a housing fixable attachment unit fixed to a lower portion of said housing for mounting said housing to an external support.

23. The signal coupling apparatus as set forth in claim 22, said cylindrical housing having a corrugated outer surface to prevent surface flashover between said charging area and said housing fixable attachment unit.

24. The signal coupling apparatus as set forth in claim 20, said first end of said housing having a diameter smaller than a diameter of said second end of said housing, said first end of said housing having a plurality of circumferential parallel ridges over which said protection cap is elastically mounted.

25. The signal coupling apparatus as set forth in claim 24, further comprising a lead line holder integrated with the protection cap for accommodating said voltage lead line in order to easily attach and detach the protection cap and to more firmly fix the voltage lead line.

26. The signal coupling apparatus as set forth in claim 25, wherein the lead line holder integrated with the protection cap includes:
a channel through which said voltage lead line passes when said protection cap is attached or detached from said first end of said housing; and
a keyhole shaped opening having a circular portion with a diameter slightly less than a diameter of an insulated portion of the voltage lead line for firmly clamping said lead line holder onto said insulated portion of the voltage lead line when said protection cap is attached to said first end of said housing.

27. The signal coupling apparatus as set forth in claim 20, wherein the protection cap is made of climatic and high insulating elastic material.

28. The signal coupling apparatus as set forth in claim 27, wherein the climatic and high insulating elastic material is a synthetic rubber.

29. The signal coupling apparatus as set forth in claim 27, wherein the high insulating elastic material is a ceramic or silicon rubber.

30. The signal coupling apparatus as set forth in claim 19, wherein said second end of said housing is comprised of a metal plate for sealing said cavity.

31. The signal coupling apparatus as set forth in claim 30, wherein the cavity is filled with a high insulating gas.

32. The signal coupling apparatus as set forth in claim 31, wherein the high insulating gas is sulfur hexafluoride.

33. The signal coupling apparatus as set forth in claim 30, wherein the cavity is vacuum processed.

34. The signal coupling apparatus as set forth in claim 19, further comprising a cut-out switch disposed between said voltage lead line and said power line.

35. The signal coupling apparatus as set forth in claim 34, said cut-out switch comprising a power fuse.

36. The signal coupling apparatus as set forth in claim 19, wherein the housing is made of a high insulating material.

37. The signal coupling apparatus as set forth in claim 19, wherein the high-pass filter has a high frequency band from 100 kHz to 34 MHz.

* * * * *